May 4, 1948. M. E. DUNKLEY 2,440,676
FOOD TREATMENT PROCESS
Filed April 4, 1942 13 Sheets-Sheet 1
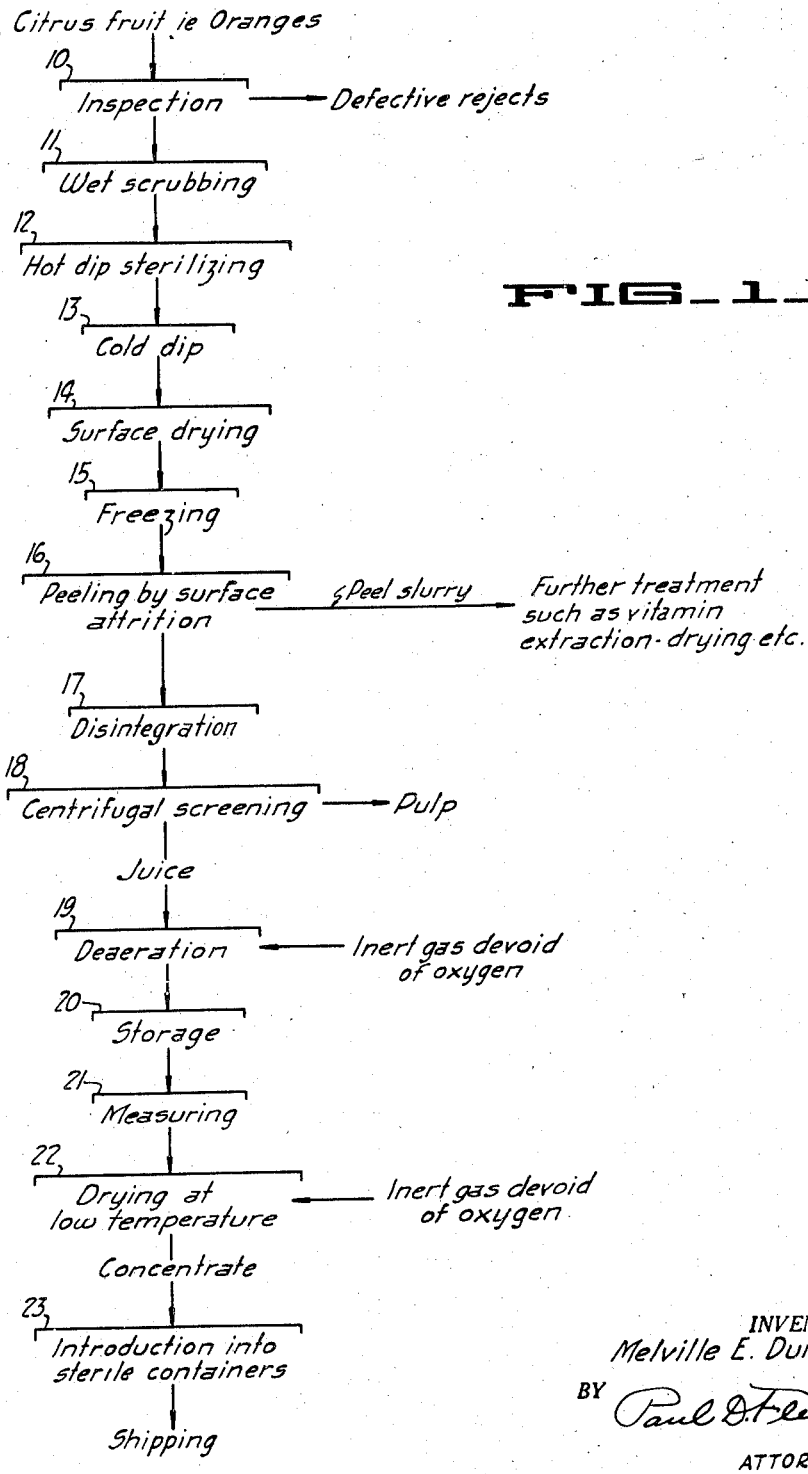

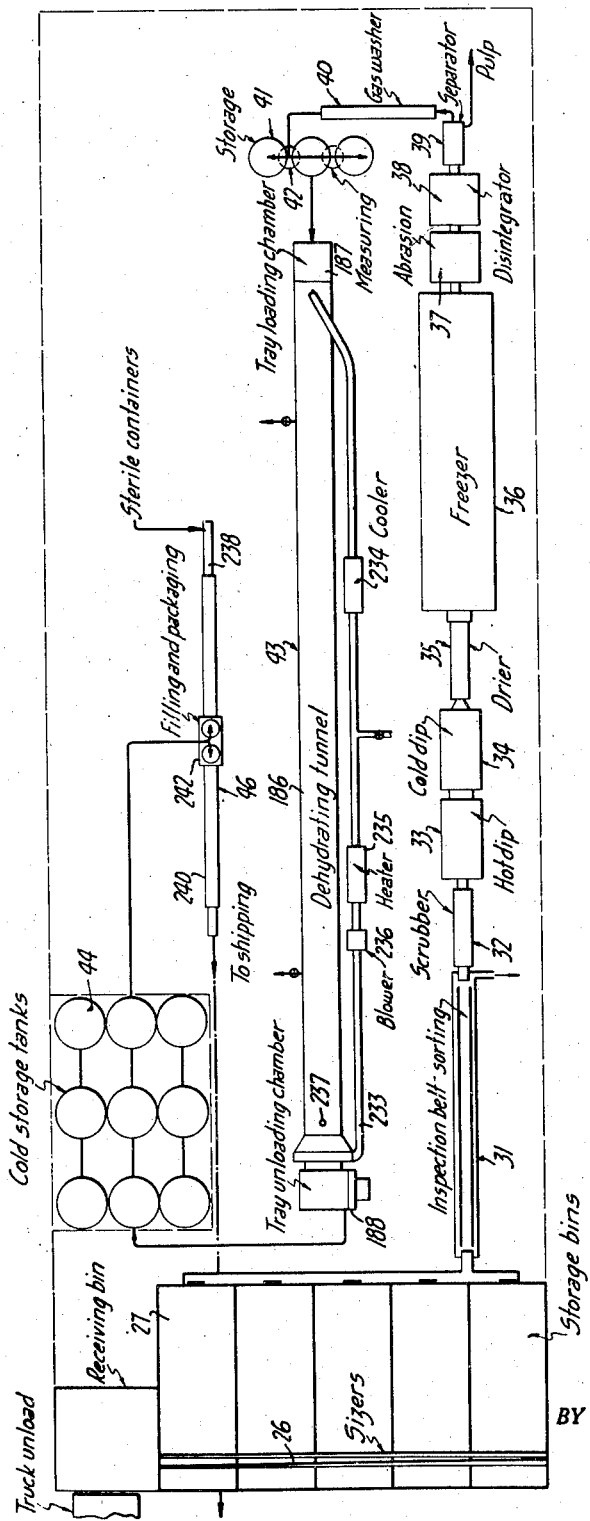

May 4, 1948. M. E. DUNKLEY 2,440,676
FOOD TREATMENT PROCESS
Filed April 4, 1942 13 Sheets-Sheet 3
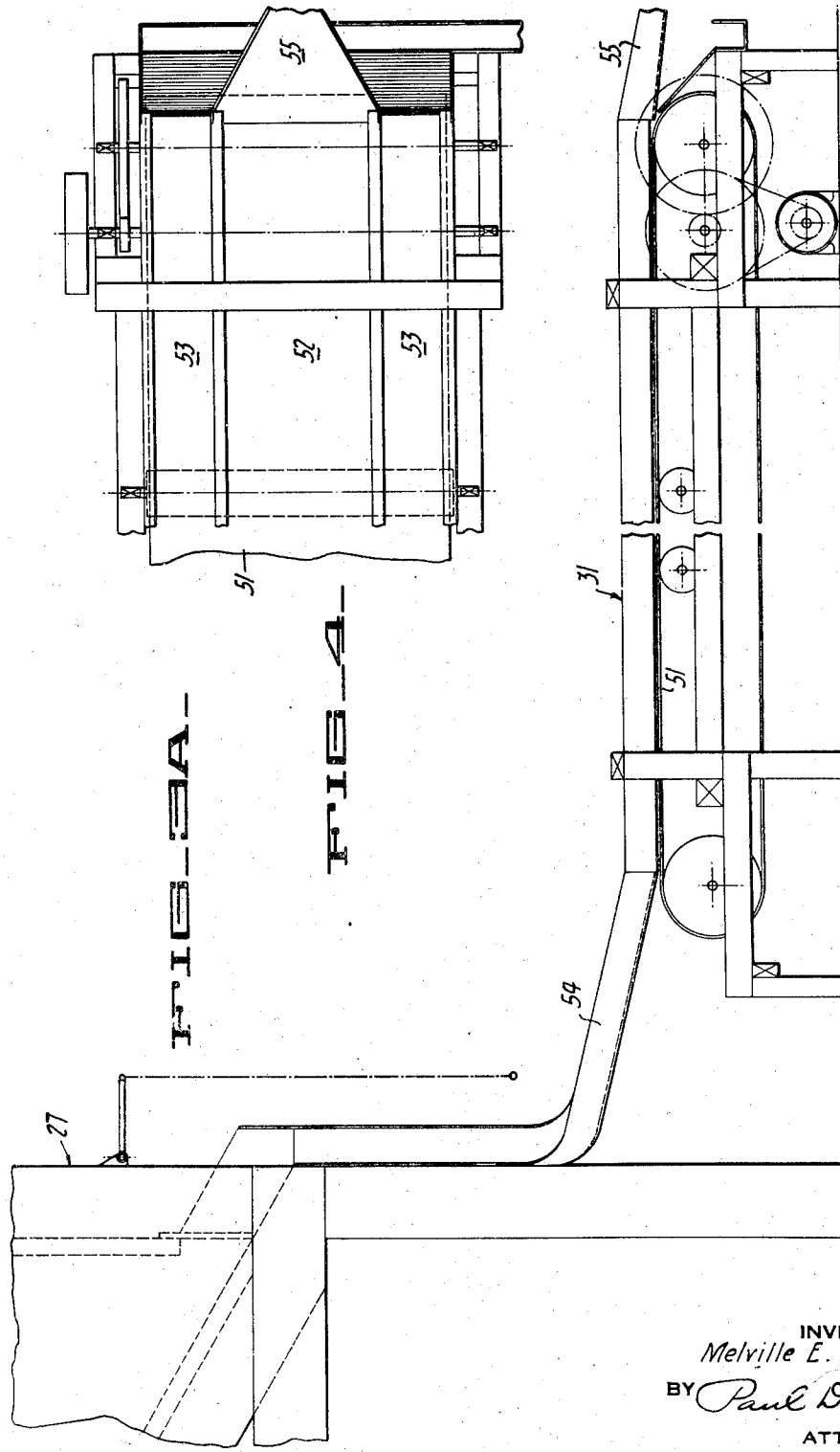
INVENTOR
Melville E. Dunkley
BY
ATTORNEY May 4, 1948.
M. E. DUNKLEY
2,440,676
FOOD TREATMENT PROCESS
Filed April 4, 1942
13 Sheets-Sheet 4
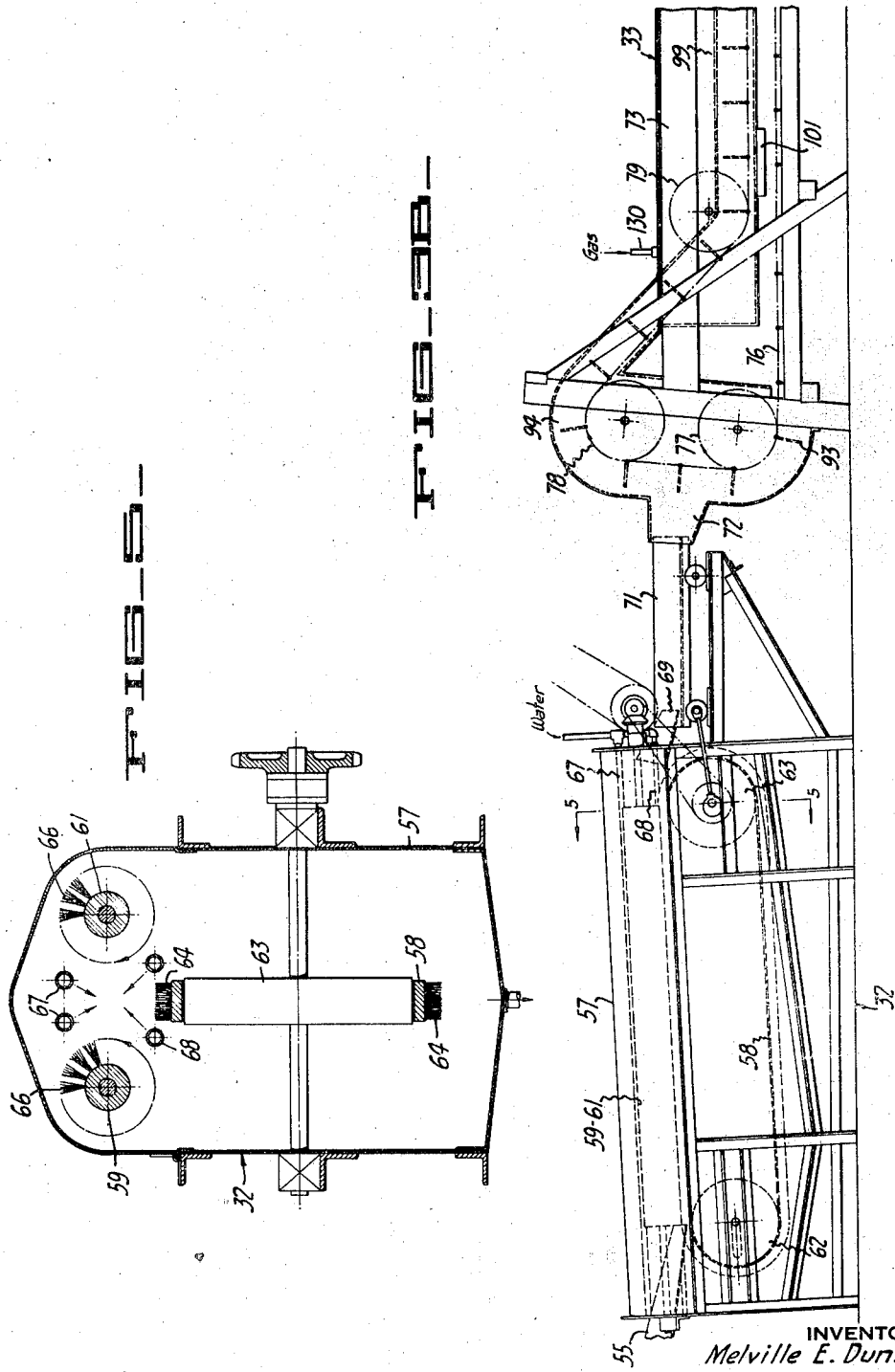
INVENTOR
Melville E. Dunkley
BY
ATTORNEY

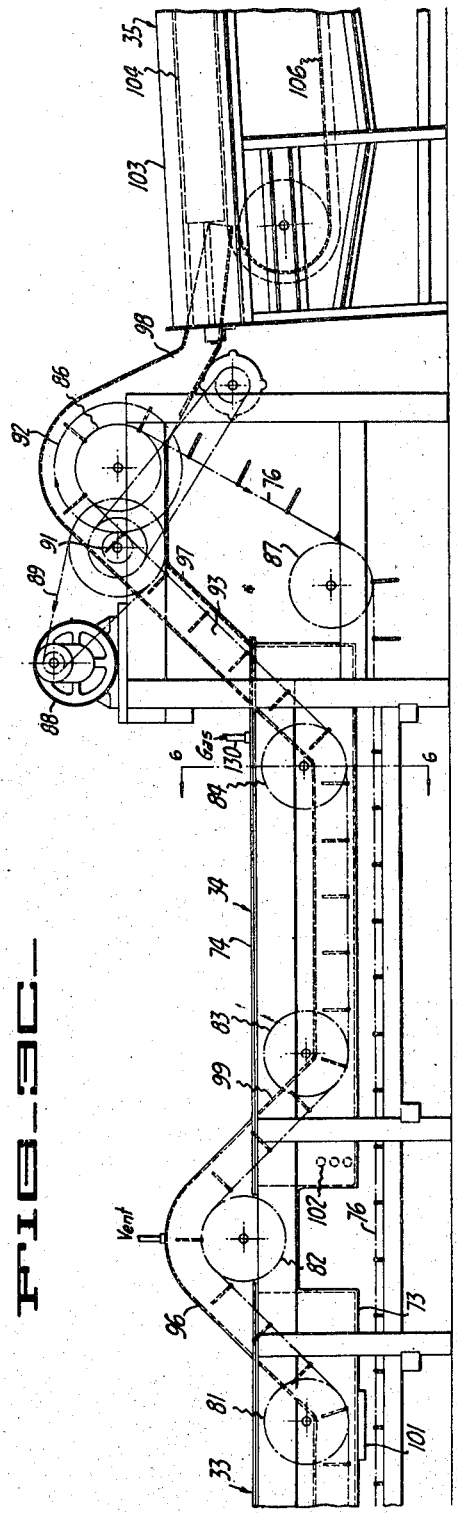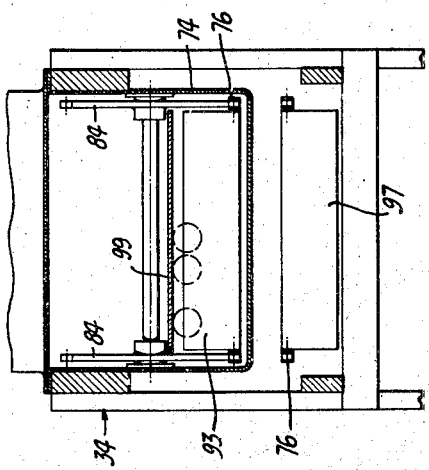

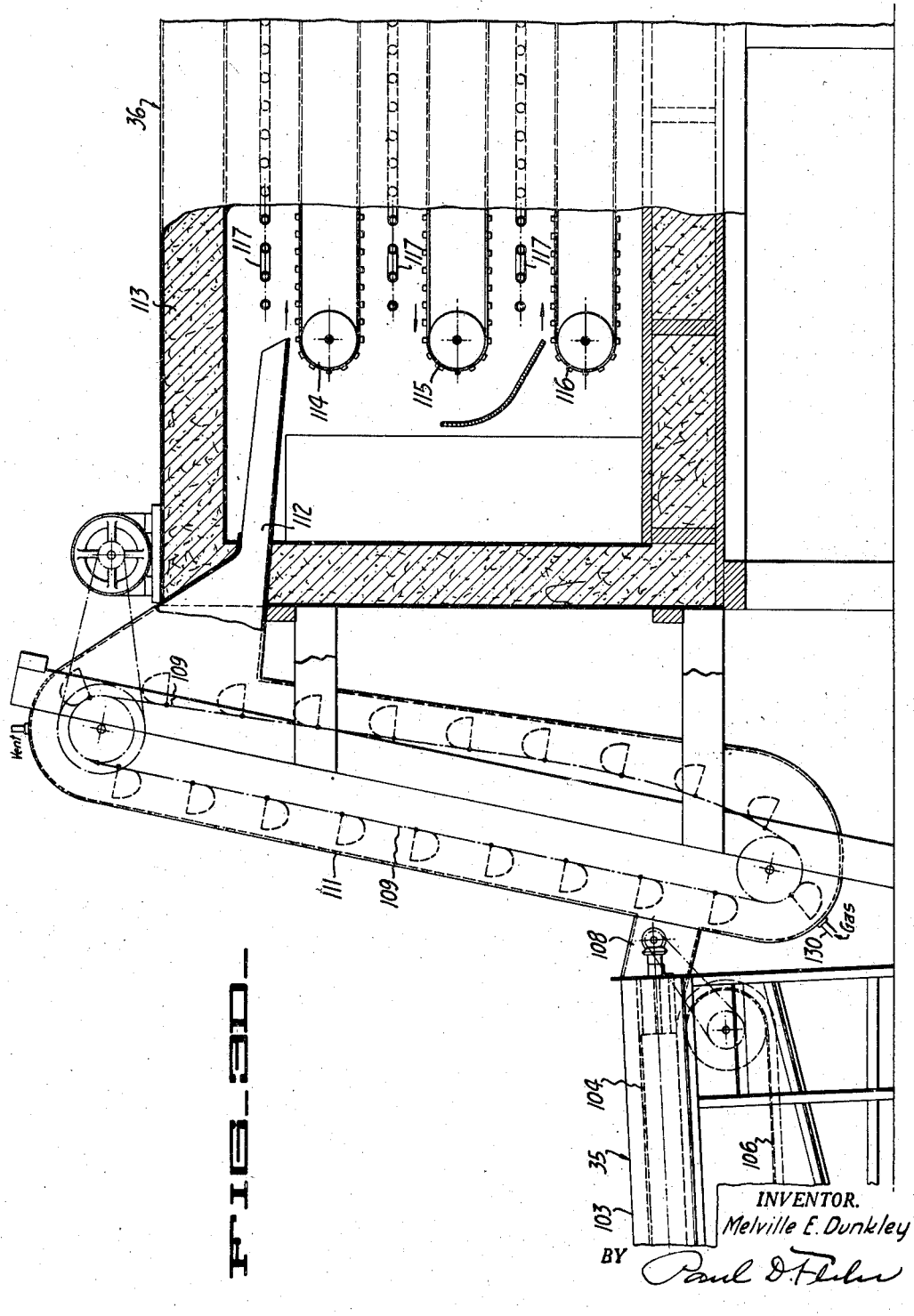

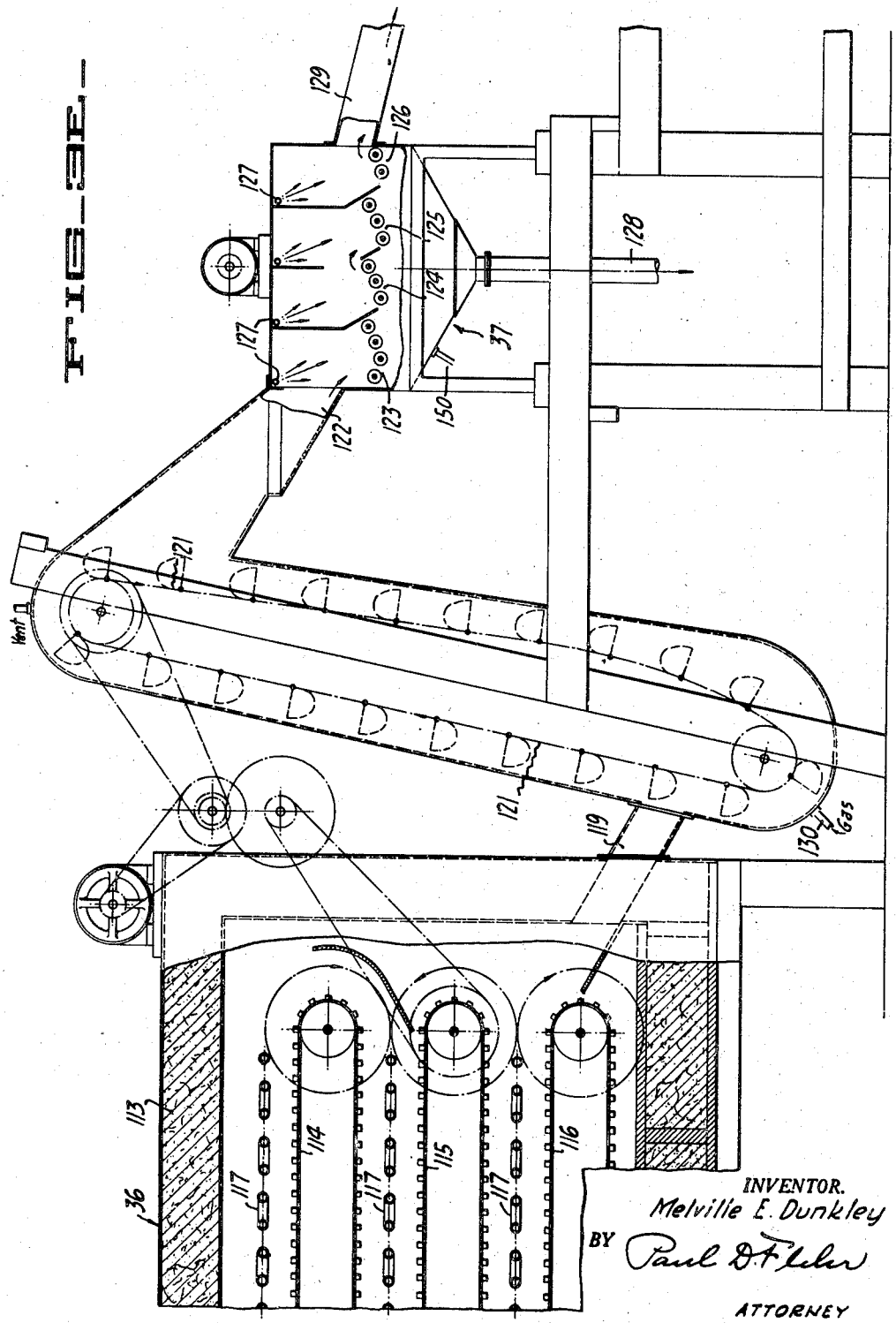

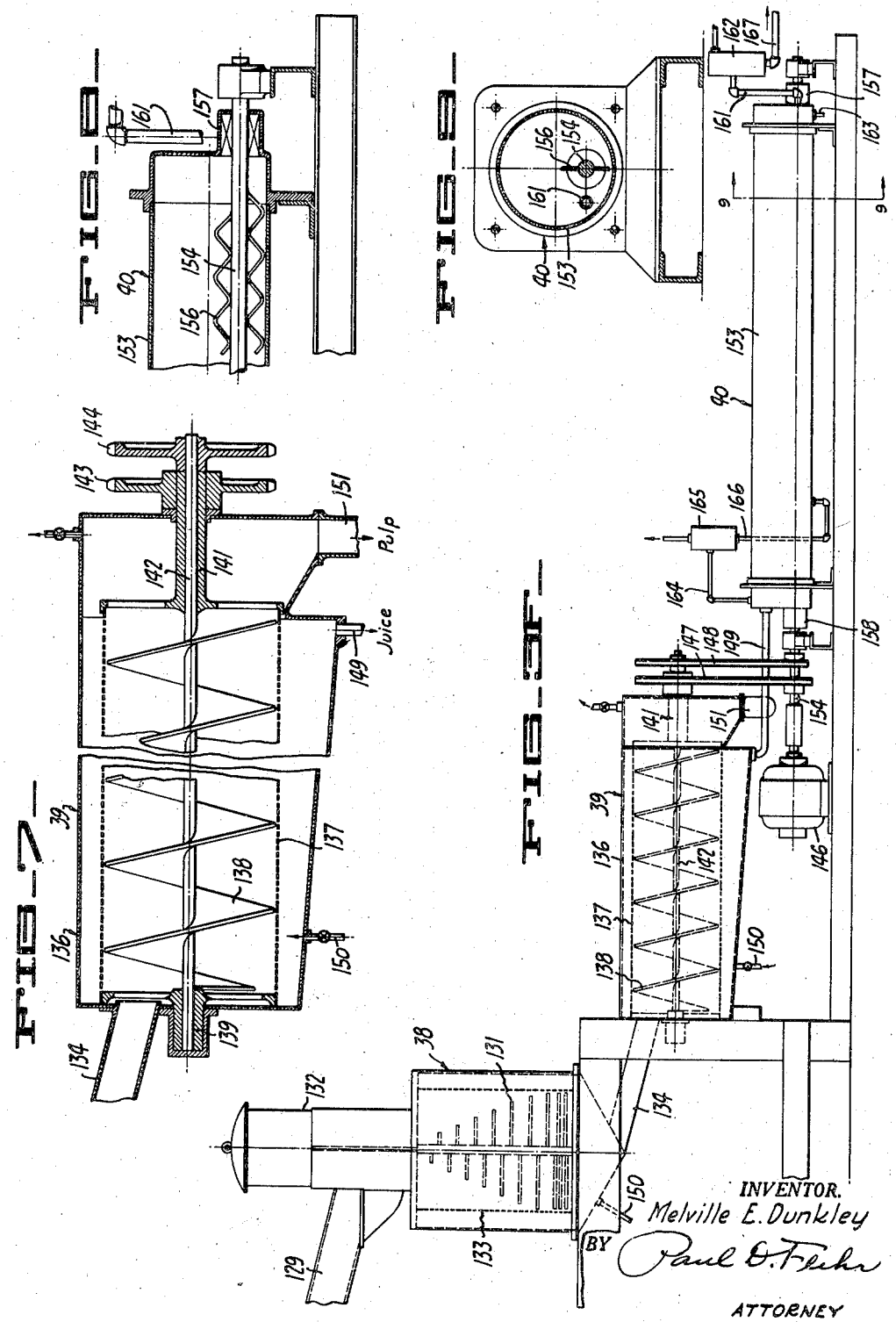

May 4, 1948.　　　　　M. E. DUNKLEY　　　　　2,440,676
FOOD TREATMENT PROCESS
Filed April 4, 1942　　　　13 Sheets-Sheet 9
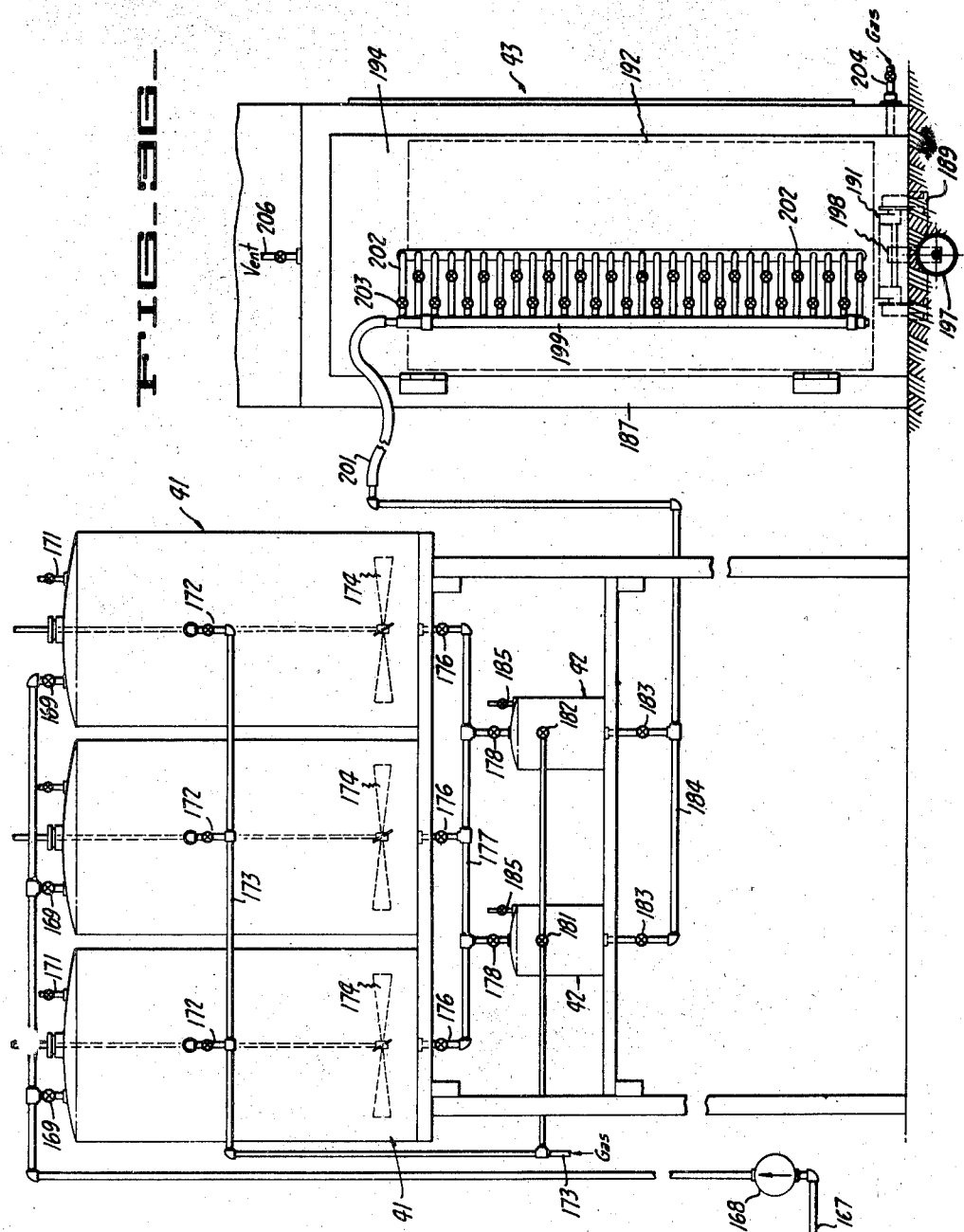
INVENTOR.
Melville E. Dunkley
BY Paul D. Flehr
ATTORNEY May 4, 1948. M. E. DUNKLEY 2,440,676
FOOD TREATMENT PROCESS
Filed April 4, 1942 13 Sheets-Sheet 10
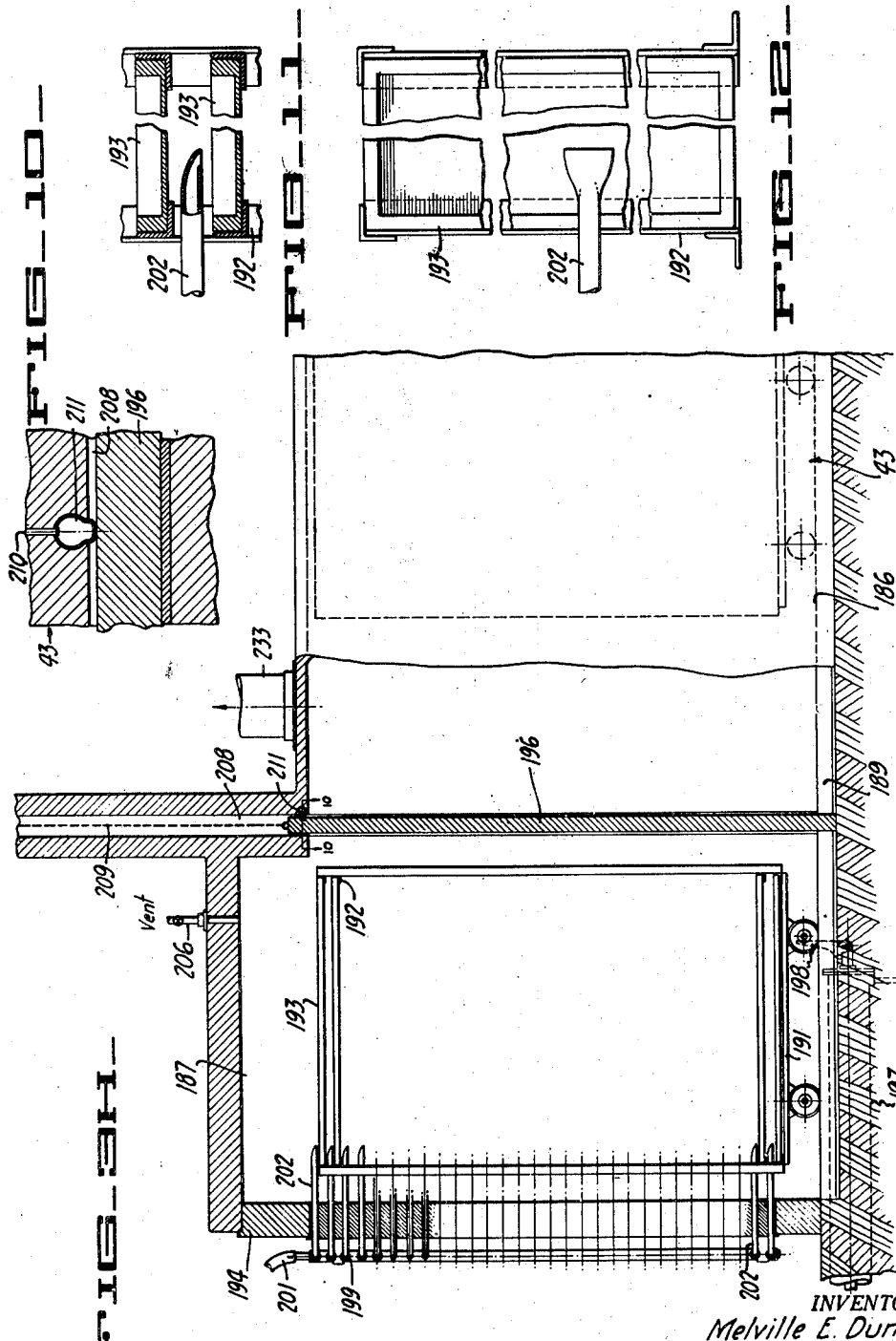
INVENTOR.
Melville E. Dunkley
BY Paul D. Flehr
ATTORNEY

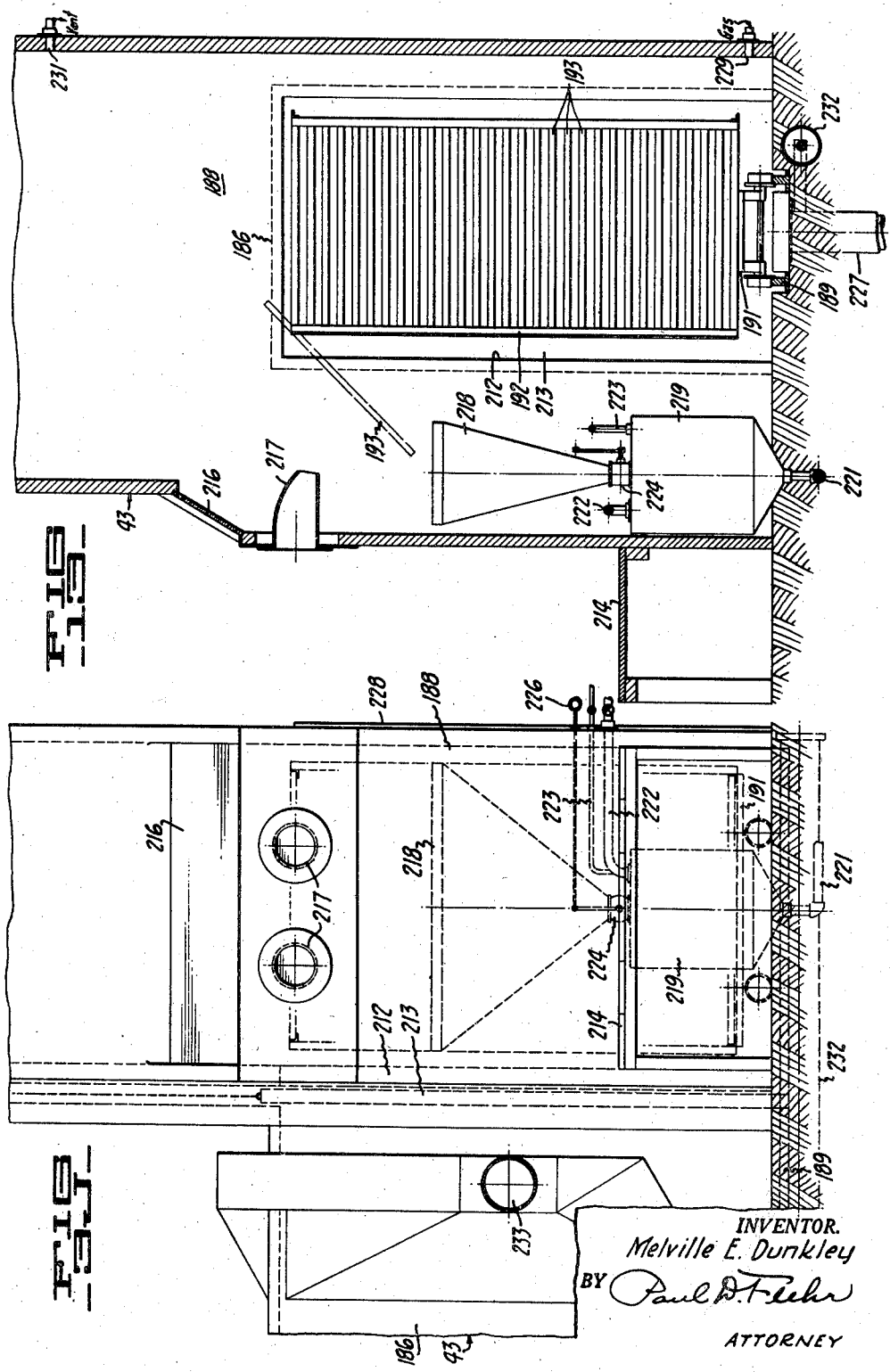

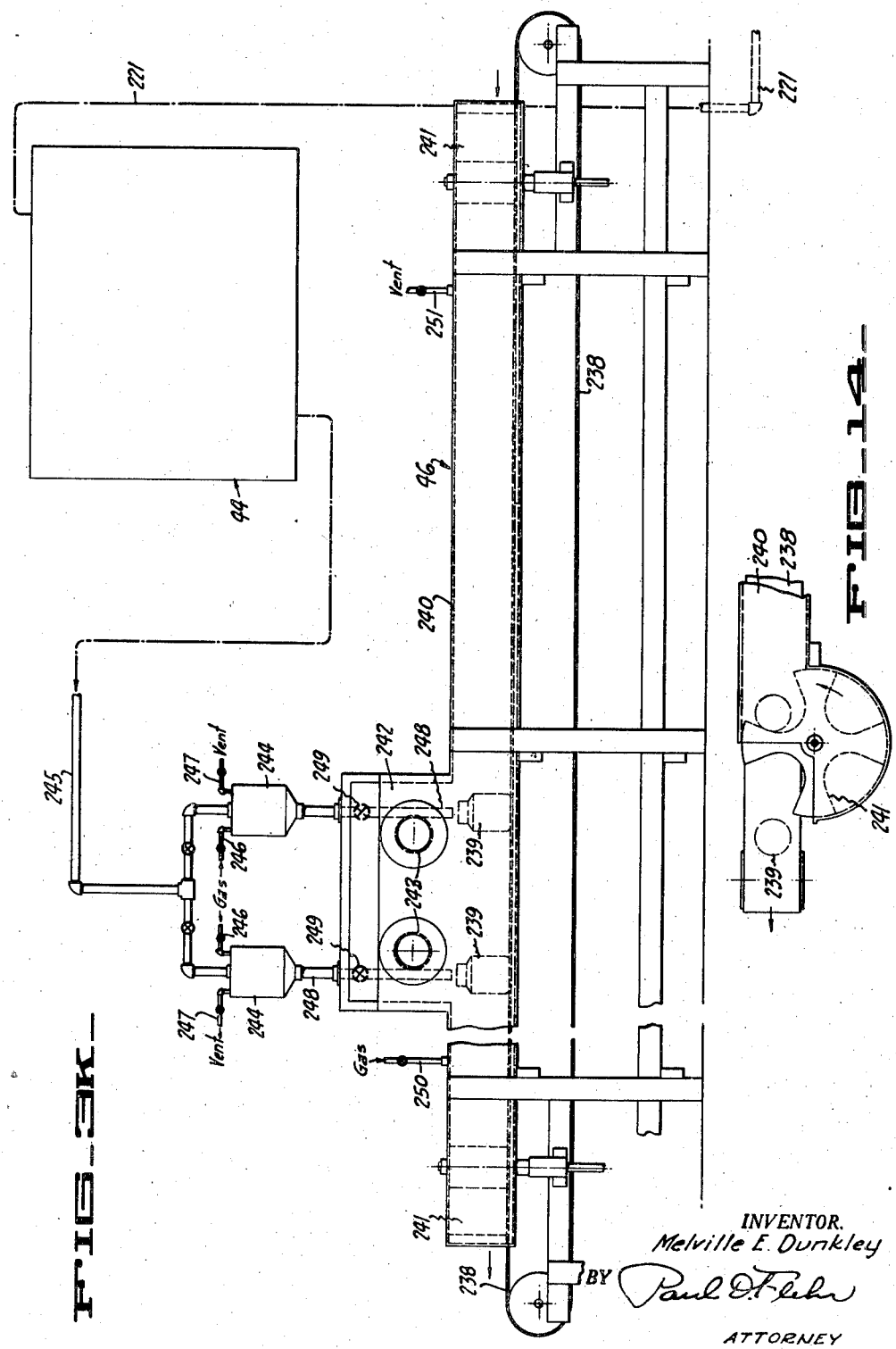

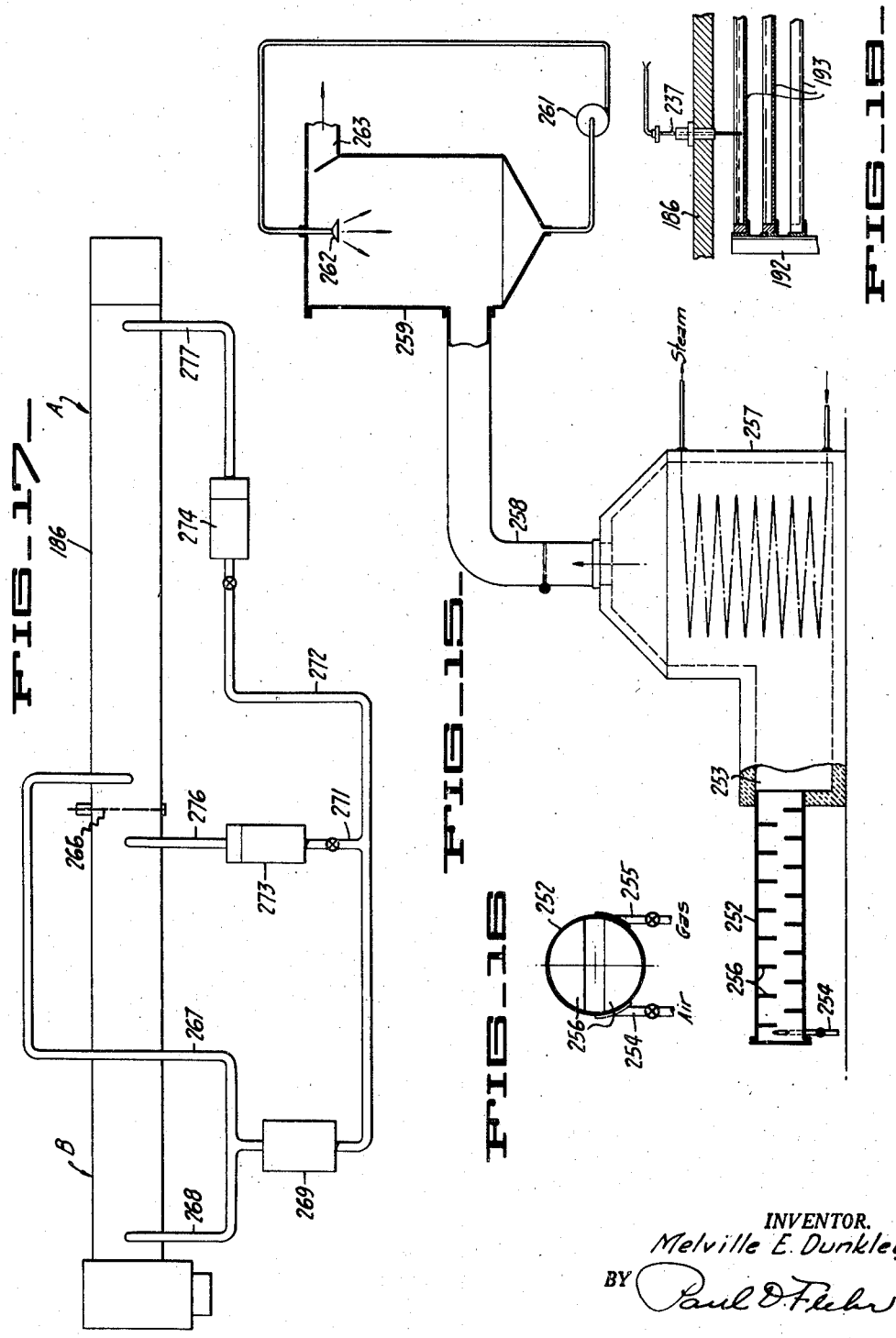

Patented May 4, 1948

2,440,676

UNITED STATES PATENT OFFICE 2,440,676

FOOD TREATMENT PROCESS

Melville E. Dunkley, Vernalis, Calif.

Application April 4, 1942, Serial No. 437,661

5 Claims. (Cl. 99—155)

This invention relates generally to processes and apparatus for the treatment and handling of various food products, for the purpose of forming marketable food products in dehydrated or concentrated condition.

It is an object of the invention to provide a process and apparatus of the above character having improved features with respect to the procedure and apparatus employed for dehydrating or concentrating the food material. In this connection the invention is characterized by use of relatively low temperatures for dehydration or concentration, together with the fact that during both preliminary preparation and subsequent evaporation of moisture from the material, it is in contact with a sterile and oxygen-free atmosphere.

A further object of the invention is to provide a process and apparatus of the above character characterized by the fact that the temperatures employed during dehydration are regulated by the temperature of the material being treated. The material itself is thus subjected to evaporation without danger of impairment of its desirable properties by heat.

A further object of the invention is to provide a novel apparatus for carrying out drying or concentrating operations according to the present process, and which is characterized by features including the following: a relatively high commercial capacity; the handling of material in trays which are arranged to be emptied without contact with the air; and a means to facilitate quick loading of material into the drying trays; and provision for unloading the separate trays before they are removed from the dehydrating unit.

Another object of the invention is to provide a novel method for removing the peel or skin of fruit, the method being characterized by the freezing operation followed by removal of the skin by attrition.

Another object of the invention is to provide an improved method and apparatus for removing dissolved oxygen from fruit juices.

Another object of the invention is to provide a process and apparatus particularly adapted for the purpose of producing preserved concentrates from citrus fruit. In this connection the invention is characterized by the preferred use of a number of novel operations and equipment for the same, including preliminary cleansing of the fruit, sterilizing of the fruit, drying of the surfaces of the fruit after such sterilizing, freezing of the fruit, removal of the frozen peel by attrition, removal of juice from the flesh of the fruit, removal of dissolved oxygen, concentration by evaporation in such a fashion as to leave the flavor and food value of the juice substantially unimpaired, and then packaging of the concentrate in sterile containers.

Another object of the invention is to provide improved method and apparatus for the packaging and sealing of the finished product, characterized particularly by the fact that the material remains at all times in a sterile and oxygen-free atmosphere, thus insuring permanent sterile and oxygen-free conditions inside the final packages.

Additional objects of the invention will appear from the following description in which the preferred embodiment has been set forth in detail in conjunction with the accompanying drawings.

Referring to the drawings:

Figure 1 is a flow sheet illustrating a complete process for the manufacture of citrus juice concentrate;

Figure 2 is a diagrammatic layout showing the various pieces of equipment for carrying out the flow sheet of Figure 1;

Figures 3A to 3K inclusive are side elevational views intended to be placed end to end, and showing equipment as follows:

Figure 3A—Conveying equipment for manual inspection and sorting of citrus fruits;

Figure 3B—Equipment for the wet scrubbing of the citrus fruit, together with one end portion of equipment for immersing the fruit in a sterilizing solution;

Figure 3C—The remainder of the apparatus for immersing the fruit in a sterilizing solution, and a portion of the equipment for drying the fruit;

Figure 3D—A portion of the equipment for drying the fruit, and the inlet portion of the apparatus for freezing the fruit;

Figure 3E—The remaining portion of the apparatus for freezing the fruit, and the attrition mill for removing the peel;

Figure 3F—The disintegrating mill for pulping the fruit flesh, the centrifugal filter for filtering out the coarser pulp, and the apparatus for deaerating the juice;

Figure 3G—The storage and measuring tanks for the deaerated juice, and portion of the concentrating or drying unit, particularly the loading end of the same;

Figure 3H—The loading chamber of the drying unit, partly in cross section, and a portion of the main drying chamber of this unit;

Figure 3J—The discharge end of the drying unit and the unloading chamber from which the cars are removed;

Figure 3K—The storage tank for receiving the finished concentrate and the apparatus for placing the concentrate into sterile containers.

Fig. 4 is a plan view of a portion of the sorting conveyor shown in Figure 3A;

Fig. 5 is an enlarged cross sectional detail taken along the line 5—5 of Figure 3B;

Figure 6 is a cross sectional view taken along the line 6—6 of Figure 3C;

Figure 7 is an enlarged cross sectional detail showing details of the centrifugal filter for removing the coarser pulp from the juice;

Figure 8 is an enlarged cross sectional detail showing the construction of the deaerating equipment;

Figure 9 is a cross sectional detail taken along the line 9—9 of Figure 3F;

Figure 10 is a cross sectional detail taken along the line 10—10 of Figure 3H;

Figure 11 is an enlarged cross sectional detail showing the manner in which the filling nozzles are disposed to deliver material into the trays;

Figure 12 is an enlarged detail showing a plan view of one of the charging nozzles, as it delivers material into a tray;

Figure 13 is a side elevational view in cross section of Figure 3J showing a portion of the unloading chamber, and the means utilized for discharging the trays; and Figure 14 is an enlarged detail in plan showing one of the rotary valves for transferring containers into and from the filling equipment of Figure 3J.

While the present invention is applicable to treatment of a wide variety of materials, including materials in both liquid and solid form, it will be described particularly in connection with the manufacture of a preserved concentrate from citrus fruit such as oranges, lemons or grapefruit. Because of certain features of my process which will be presently described, it is capable of producing a preserved citrus fruit concentrate having all of the natural flavor and nutritive properties of the original juice, and which can be re-mixed with water to produce a reconstituted juice for use in place of fresh juice.

Before considering the various features of equipment illustrated in the drawings, a brief explanation will be made of Figure 1 which shows the sequence of operations which I prefer to employ with citrus juice. Thus, the fresh fruit is first subjected to inspection 10, where defective or spoiled fruit is removed. It is then subjected to wet scrubbing 11, for the purpose of removing all foreign matter from the other surface. The scrubbed or cleaned fruit is then subjected to sterilizing 12, by immersion in a sterilizing solution.

Following sterilization, the fruit is passed to the cold dip 13, where it is immersed in relatively cool sterile water. The fruit then passes to the drying operation 14 to remove surface moisture, after which it passes to the freezing operation 15. Freezing is carried out so that at least the peel is frozen, together with a part of the fruit flesh near the peel.

Following freezing the fruit is passed to the peeling operation 16 where the frozen peel is removed by attrition. This operation results in formation of a peel slurry which can be used to make various products, as for example vitamin food materials and vitamin concentrates. The fruit flesh passes to the disintegrating operation 17, where it is reduced to a divided mass. This is then subjected to a screening operation 18 for removing the coarser pulp from the juice. The juice is now in condition for further treatment to form a preserved concentrate.

Immediately after being freed from the coarser pulp, the juice is subjected to treatment for removing absorbed oxygen. I prefer that this be carried out by a deaeration operation 19, in which a sterile inert gas devoid of oxygen is used to disperse the dissolved oxygen from the juice. The de-oxidized juice is then passed to the point of storage 20, from which it may be withdrawn through the measuring operation 21 and from thence to the dehydrating or concentrating operation 22. The drying or concentrating is carried out at relatively low temperatures, and while in contact with a sterilizing drying gas devoid of oxygen.

The concentrate resulting from operation 22 is then packed into suitable sterile containers as indicated at 23 to produce a final packaged and preserved product.

A general diagrammatic layout of apparatus for carrying out the various operations is shown in Figure 2. In this case the citrus fruit is first handled by the sizers 26 which deliver the fruit to the storage bins 27. From these bins the fruit is passed to the inspection unit 31 where the fruit is inspected manually and defective fruit discarded. From the inspection unit the fruit passes to the wet scrubber 32, and then successively to the hot dipping unit 33 and the cold dipping unit 34, and the surface drier 35. From the drier the fruit passes to the freezer 36, and the frozen fruit then passes to the abrasion peeler 37, where the peel is removed. The body or flesh of the fruit passes to the disintegrator 38 and the resulting macerated mass then passes to the centrifugal separator 39. The juice from the separator passes through the deaerating equipment 40, in which absorbed oxygen is dispersed with a sterile inert gas, and the de-oxidized juice then passes to the storage tanks 41. From these tanks the juice can pass to the measuring tanks 42, and from thence to the loading chamber of the dehydrator or concentrator unit 43. The concentrate from the outlet end of the dehydrating unit is delivered to the storage tank 44, where it is kept at a relatively low temperature, and from these tanks the juice passes to the filling and packaging machinery 46. During its treatment in the successive units, the juice at no time is subject to either contamination or oxydation.

Referring now the various features of apparatus shown diagrammatically in Fig. 2, the sizer 26 and storage bins 27 require no particular description, as these may be conventional or may vary in different instances. The inspection and sorting equipment 31 may be formed generally as shown in Figures 3A and 4. In this instance it consists of a conveyor belt 51 divided by guide rails into a main portion 52 and side portions 53. A chute 54 from the storage bins 27 delivers fruit to the belt portion 52, and while the fruit is carried along it is inspected, and defective fruit shifted to the side belt portions 53. The discharge end of the main belt portion 52 delivers the fruit through chute 55 to the receiving end of the scrubber 32, (Figures 3B and 5).

The scrubber is preferably constructed so that the surface of the fruit is vigorous scrubbed with bristles while the fruit is kept wet with water. The machine illustrated is formed with a closed housing 57, within which there is an endless belt 58 in conjunction with the rotary scrubbing rolls 59 and 61. The endless belt 58 is carried by sheaves or pulley wheels 62 and 63, one of which is driven at a suitable rate as indicated. Suitable bristles 64 of relatively stiff fiber are mounted upon the exterior of this belt 58, and the rolls 59 and 61 are provided with similar bristles 66. Above and below the space between the rolls 59 and 61 are the water spray pipes 67 and 68. These are arranged to spray water into the region between the rolls 59 and 61 and upon the fruit being treated.

As shown in Figure 3B, the upper run of the belt 58 and the axis of the rolls 59 and 61 are parallel and are inclined upwardly towards the delivery end. The belt 58 is driven so that its upper run travels toward the delivery end at a suitable speed such as 450 feet per minute. Rolls 59 and 61 are likewise driven at a suitable speed, such as 450 R. P. M., and in opposite directions as indicated.

The scrubbing apparatus operates as follows: As the fruit is delivered from the chute 55 into the receiving end of the housing 57, it is delivered upon the upper run of the belt 58 and commences its advance through the machine in the region between the rolls 59 and 61. While advancing, it is ricocheted vigorously back and forth into contact with the rolls and the bristles on the upper run of the belt 58, while at the same time it is subjected to a spray of water. This serves to remove all foreign material from the skin of the fruit. Finally the fruit is delivered from the upper right hand end of the machine as shown in Figure 3B, into the discharge chute 69.

The hot and cold dipping units 33 and 34 are shown in Figures 3B and 3C, together with Figure 6. Discharge chute 69 from the scrubbing unit 32 delivers the fruit to a shaker conveyor 71, which in turn delivers the fruit to the inlet 72 of the hot dipping units 33. These units make use of closed tanks 73 and 74, together with suitable conveying means whereby the fruit is conveyed through these tanks successively. The conveying means includes the endless conveyor chain 76 which engages over a series of sprockets, including the end sprockets 77 and 78, sprockets 79 and 81 in tank 73, sprocket 82 between the tanks 73 and 74, sprockets 83 and 84 in tank 74, and sprockets 86 and 87 at the delivery end of the apparatus 34. Sprocket 86 is driven by motor 88 through the belt 89 and gears 91 and 92. Spaced plates 93 are mounted upon the chain or belt 76 so that rows of fruit can be retained between successive plates. A housing or shroud 94 houses the moving parts of the conveyor from the time the fruit is received through the inlet 72 until it is delivered into the tank 73. Similarly the moving parts of the conveyor pass through housing 96, which connects the tanks 73 and 74. A similar housing 97 encloses the moving parts of the conveyor as they leave the tank 74, and this housing connects with the inlet chute 98 of the drying machine 35. In passing through the tanks 73 and 74, the plate 93 passes beneath the horizontal baffle walls 99 which serve to retain the fruit in place between the plates.

The liquid medium in tank 73 is water, together with a sterilizing agent such as chlorine. The temperature of the water is maintained at an elevated value, such as of the order of 210° F. as by means of burners or electrical heaters 101. The unit can be made to retain the fruit in the hot dip for a period such as from 5 to 6 seconds.

The liquid in tank 74 is cool sterile water, and the immersion of the fruit in this water serves to prevent undesirable penetration of heat into the flesh of the fruit. The temperature of the water in this tank may be of the order of from 50 to 70° F. If water of this temperature is not available, the tank can be equipped with cooling pipes or coils 102. The water can be maintained sterile by means of a sterilizing agent like chlorine.

The drying unit 35 is constructed similarly to the scrubber 32, except that no water spray is provided. It consists of an upwardly inclined housing 103, which has spaced brushing rolls 104, and the brush equipped belt 106. The rolls 104 are driven together with the brush equipped conveyor 106 in the same fashion as the scrubbing unit, with the result that the fruit passes through the space between the brushing rolls 104, with a spinning and ricocheting action, until being finally delivered to the discharge chute 108 (Figure 3D). The fruit is generally confined to the space between the rotary brushes 104 by pipes or rods corresponding to the spray pipes 67 and 68 (Figure 5).

The freezing unit 36 shown in detail in Figures 3D and 3E receives the fruit from the drier 35. As the fruit is delivered through the spout 108, it is carried upwardly by the bucket conveyor 109, which in turn is enclosed within the housing 111. As the fruit is dropped from the upper end of the conveyor 109, it is delivered to the inlet chute 112 of the freezing unit 36.

The freezing unit 36 preferably consists of an insulated housing 113, within which is a series of slow moving endless belt conveyors 114, 115 and 116. Freezing coils 117, which connect with suitable refrigerating equipment, are disposed above the upper runs of the conveyors. The fruit is carried to the right by the conveyor 114 and then drops from the right hand end of this conveyor upon the receiving end of the conveyor 115. The conveyor 115 carries the fruit to the left hand end where it is again dropped upon the receiving end of conveyor 116. The right hand end of conveyor 116 finally delivers the frozen fruit to the discharge spout 119.

The time period of retention of the fruit in freezing unit 36 is such that all of the peel and at least the outer portion of the flesh is frozen. The penetration of the freeze may be deeper than necessary without detrimental results. The time period of retention will depend upon the heat absorbing capacity of the coils 117 and the character of the fruit being frozen.

After being delivered from the freezing unit, through chute 119, the frozen fruit is lifted by the enclosed elevating conveyor 121 and delivered through the inlet 122 of the peeling or abrasion machine 37. This machine can be constructed like the Urschel continuous vegetable peeler. From the feed hopper 122, the fruit passes back and forth over a series of rotating attrition rolls 123, 124, 125 and 126. Instead of having these rolls coated with Carborundum, as is the case with Urschel's vegetable peeler, I use metal spines, as for example spines closely set upon the peripheries of the rolls and ⅛ inch in length. The various compartments of this unit are also provided with spray pipes 127 and during operation of the machine, a small amount of sterile water is sprayed upon the fruit.

The peel removed from the fruit in unit 37 is in the form of a slurry and can be withdrawn through pipe 128. The meat of the fruit is discharged through chute 129. During attrition of the peel, the peel dissolves so that the peel slurry is relatively fluid, although a certain amount of the flesh remains frozen, particularly that part adjacent the peel. Therefore, even though the flesh is penetrated to a minor degree by the abrasive action of the rolls, no substantial amount of juice is lost, and the body of the fruit remains firm. Peel oil is removed together with the slurry through pipe 128, so that substantially no peel oil finds its way into the juice subsequently extracted from the meat.

The freezing procedure for removing the peel can be applied to products other than citrus fruit. For example, it can be applied to thin skinned fruit like plums, or products like tomatoes.

Prior to peeling, the juice is protected by the peel. However, in peeling if the peel itself contains contaminants such as micro organisms which promote spoilage, the juice will be contaminated. Therefore, following the hot dipping unit the fruit is kept out of contact with the atmosphere. This is accomplished by enclosing the various units and the transfer means between the same and by maintenance of a sterile non-oxidizing gas in the enclosures. Thus at various points, pipes 130 are provided for bleeding in a sterile inert gas devoid of oxygen, and this gas may gradually escape from different points of the equipment or may pass out through special vent pipes.

From the peeler 37 the fruit is delivered through chutes 129 to the disintegrating unit 38 (Figure 3F). This disintegrator is preferably of the vertical hammer mill type, in which a vertical rotor operates within a cylindrical screen. Various types of disintegrators can be used, but the one shown in the Rietz Patent No. 2,153,590 will give good results. Briefly, this disintegrator consists of a rotor 131 provided with blades or hammers and driven by the electric motor 132. The fruit is dropped into the zone of operation of the rotor and disintegrated by action of the hammers. The disintegrated material passes through the cylindrical screen 133 and downwardly through the discharge conduit 134 to the centrifugal filter 39.

The type of centrifugal filter illustrated (Figures 3F and 7) consists of a housing 136, within which there is a horizontally disposed cylindrical screen 137. Fitted within the screen 137 there is a feed screw 138, the thread or flight of which is formed of resilient rubber. Screen 137 is rotatably carried by the end shafts 139 and 141, which are suitably journaled to the end walls of the housing 136. The shaft 142 of feed screw 138 is journaled concentrically with the screen shafts 139 and 141, and the outer ends of shafts 141 and 142 are provided with the driving gears 143, 144. A motor 146, together with driving chains 147 and 148, is shown for driving the sprockets 143 and 144. Both the screen and the inner feed screw are driven in the same direction, but the feed screw is driven slightly faster than the screen, so that such relative movement causes a progression of pulp from the inlet end to the right hand discharge end of the screen. Thus as the material is received through the pipe 134, it is received within this screen 137, and centrifugal force causes juice to pass through the screen to the drain pipe 149. The coarser pulp gradually progresses under the urge of the feed screw 138, until it reaches the right hand discharge end of the screen, where it is delivered to pass out of the housing through pipe 151.

An inert non-oxidizing atmosphere is also maintained in the units just described which follow the freezing unit. For this purpose I have shown the gas inlet pipes 150.

The deaerating equipment 40 which follows the centrifugal filter 39 consists of an extended cylindrical shaped housing 153, which has its left hand inlet end connected to the juice pipe 149. Extending through the lower part of the chamber 153, there is a rotating shaft 154 which carries the beaters 156. The ends of shafts 154 have journals 157 and 158 in the end walls of the chamber 153, and an extension of this shaft is shown directly coupled to the motor 146. A relatively high rate of driving speed can be used, as for example of the order of 1,500 R. P. M. A pipe 161 connecting with the right hand end of chamber 153 serves to remove the deaerated juice. This pipe can be connected to a gas trap 162 to remove any entrained gas. Pipe 163 is shown connecting near the inlet end of chamber 153 for introducing an inert dispersing gas, as for example a non-oxygen containing gas such as will be presently described. Pipe 164 serves to continuously vent gas from the chamber, and this pipe is shown connecting to the trap 165 whereby entrained juice can be returned to the chamber through pipe 166.

Within the chamber 153 the juice is violently agitated to form virtually a homogeneous mass comprising a mixture of liquid and gaseous phases, thereby insuring intimate contact between the juice and the dispersing gas.

From the trap 162 the deaerated juice is delivered by pipe 167 and pump 168 to the elevated storage tanks 41. Distributing valves 169 make it possible to distribute the juice to any one of these tanks as desired. Each tank is shown provided with a vent valve 171, to vent off gas from above the liquid, as the tank is being filled. Also valves 172 control communication with a gas pipe 173 whereby an inert sterile gas can be introduced into any one of the tanks. Agitators 174 in each tank prevent undesirable settling at this point. Valves 176 control communication between the lower ends of the tank and the common outlet pipe 177. This pipe in turn connects through valves 178 to the measuring tanks 42. The measuring tanks may be made of glass or like transparent material, or in any event they should be provided with level indicating means to enable handling of predetermined amounts of juice. Manual valves 181 and 182 control communication between these tanks and the gas pipe 173, whereby gas under pressure can be introduced into either measuring tank to expel the juice. Valves 183 control communication between the lower ends of the measuring tank, and the delivery juice pipe lines 184. Both measuring tanks are also provided with venting valves 185, so that gas can be vented off from the space above the liquid, as the tank is being filled.

It will be evident that with the arrangement of storage and measuring tanks described above, it is possible to maintain the juice at all times out of contact with the air, and only in contact with an inert gas devoid of oxygen. Also the juice can be delivered as desired to the measuring tanks, and from thence the juice can be expelled by gas under pressure through the discharge pipe 184.

The drying unit 43 is of special construction adapted to handle the material in trays. In general, this unit includes the main drying chamber or tunnel 186, the loading chamber 187 (Figures 3G and 3H) and the unloading chamber 188 (Figures 3J and 13). The main drying chamber is in the form of a long tunnel as indicated diagrammatically in Figure 2. A trackway 189 extends the entire length of this unit, and the cars 191 which operate on this trackway have racks 192 for carrying the spaced trays 193. Referring particularly to the loading chamber 187 shown in Figure 3H, the chamber has a hinged door 194 which when opened permits a car loaded with trays to be introduced into the unit. From this loading position the car can be transposed into the drying chamber 186, by raising the intervening sliding door 196. In order to place a car within the main drying chamber without jerking movement, and in such a manner as to force ahead the series of cars within the drying compartment, I have shown means including a hydraulic ram 197 which has a hinged foot 198 engaging the axle of the car 191.

For the purpose of filling the individual trays, a header pipe 199 is mounted upon the door 194, and this pipe is connected by hose 201 to the juice pipe 184. A series of individual nozzle pipes 202 extend from pipe 199, through the door 194, and have their inner ends arranged to be disposed between adjacent trays in the manner shown in Figure 11. Valves 203 control the flow of juice through each individual pipe. A valve controlled pipe 204 is shown communicating with the loading chamber 187 in order to introduce an inert gas devoid of oxygen. The upper part of this chamber is also shown provided with a valve controlled vent pipe 206. It will be evident from the foregoing that when a car containing empty trays is placed within the loading compartment 187, and the door 194 closed, pipes 202 are automatically disposed in position to discharge juice into the several trays. Now by successively opening the valves 203 an operator can discharge measured quantities of juice into the trays. After all of the trays have been filled, the sliding door or gate 196 is lifted, and then the hydraulic ram 197 is operated to smoothly advance the car into the main drying compartment 186. To insure oxygen-free atmosphere in chamber 187, before the trays are filled and immediately after closing the door 194, an oxygen-free gas is introduced into the compartment through pipe 204 while pipe 206 is open to permit the displaced air to escape.

In order to provide a gate 196 which will move freely and at the same time will prevent excessive leakage to the atmosphere, I have shown an arrangement in which the gate operates within a vertical guideway 208 with the upper edge of the gate attached to the operating and counterbalancing chain 209. Extending entirely about the peripheral edge portion of the gate and mounted within the adjacent structure of the drying chamber 186, there is an inflatable tube 211 of suitable resilient material such as soft vulcanized rubber. This tube is connected to a valve controlled hose or pipe 210 whereby it can be inflated by air under pressure, or deflated by venting the air to the atmosphere. When inflated one side wall of this tube presses against the adjacent surface of the gate 196, as shown in Figure 10, to provide a relatively good gas-tight seal. When deflated, the gate has ample clearance for free movement.

A novel construction for the unloading chamber is shown in Figures 3J and 13. The doorway 212 communicating between this chamber and the main drying tunnel is normally closed by a sliding gate 213, like the gate 196 at the inlet end of the drying tunnel. Alongside one wall of the unloading chamber, there is an operator's platform 214 and an operator standing upon this platform can observe the trays through the window 216. A pair of resilient rubber sleeves 217 are also mounted within the same side walls, below the window 216, and these sleeves are arranged so that the two arms of the operator may be positioned within the same for grasping and moving the trays, while at the same time preventing the entrance of exterior air. Below the region of the sleeves 217, there is a hopper 218 which in turn connects with the tank 219. Pipe 221 connects this tank to the storage tanks 44. The upper part of tank 219 is connected to valve controlled gas and vent pipes 222 and 223. Also a valve 224 is interposed between the hopper 218 and the tank 219, and is shown being operated by the exterior handle 226. Directly below the region occupied by a car in the unloading chamber, there is a hydraulic lift or elevator 227 which is arranged to be stopped and started by the operator. By means of this elevator the operator may lift the complete car and trays by successive steps, to facilitate the grasping of trays as the trays are successively unloaded.

To briefly describe the working of the parts used in connection with the unloading chamber, if it is desired to transpose a car from the drying chamber to the unloading chamber, the outlet door 228 of the unloading chamber is closed, and then the interior of this chamber is scavenged of oxygen by permitting flow of an inert gas through pipe 229, with venting of gas through pipe 231. After thoroughly flushing out the oxygen, pipes 229 and 231 are closed, and the sliding gate 213 is raised. Assuming that this is being done in conjunction with the introduction of a freshly loaded car into the receiving end of the drying chamber, the series of the cars in the drying chamber advance toward the outlet end, thus forcing the one car into the unloading chamber 188. A hydraulic ram 232 can be used to engage the car for the purpose of forcing it into a position free of the outlet doorway 212. Now the sliding gate 213 is closed and an operator with his hands in the sleeves 217, and standing upon platform 214, grasps the top tray on the car, and pulls it forwardly to a tilted position substantially as shown in dotted lines in Figure 13.

With concentrations which are ordinarily obtainable, as will be presently described, the material in the trays will be too thick to flow freely. Therefore, it will be necessary for the operator to scrape the concentrate from the trays by means of a suitable tool. When the material in one tray has been discharged, it is placed back upon the car, and then the next tray withdrawn. As successive trays are unloaded, the operator causes the lift 227 to raise the car and trays by successive steps, thus making all of the trays readily accessible. The concentrate delivered into the hopper 218 is permitted to flow down to the tank 219. When this tank has been filled, pipe 221 is opened, valve 224 is closed, vent pipe 223 is closed, and pipe 222 is opened to permit gas under pressure to flow into the upper part of tank 219, thus expelling the concentrate into the storage tank 44.

Referring to Figure 2, a gas circulating system is connected to the drying tunnel 43, whereby oxygen-free drying gas is continuously recirculated and caused to flow longitudinally of the tunnel around and between the trays of material. Thus the gas conduit 233 connects to the tunnel near the unloading chamber, and gas withdrawn through this conduit is passed through the cooler 234, heater 235, blower 236, and from thence back into the drying tunnel near the loading chamber. The cooler 234 contains suitable refrigerated heat absorption units and serves to chill the gas to a temperature depending upon the conditions of operation, but which in the case of citrus juice may be of the order of from 40 to 50° F. In conjunction with this cooling, considerable moisture is condensed from the gas. The heater 235 circulates the gas over steam heated units, whereby the temperature of the gas is elevated to a value such as of the order of from 70 to 100° F. One or more thermostats can be provided to secure automatic temperature control.

As shown in Figure 18, the controlling thermostat 237 is mounted on the top of the drying tunnel and near the unloading chamber. It is mounted for vertical adjustment so that it can be directly inserted into the liquid carried in the top tray of the last car in the tunnel (nearest the unloading chamber). This thermostat is connected by known methods to control the heater 235, so that when the temperature of the concentrate carried by the last car reaches a predetermined maximum value (such as 78° F.) further heating of the gas is interrupted. Thus the temperature of the gas is regulated and kept within safe limits by the temperature of the material.

Figure 3K shows a suitable filling unit which will enable introduction of the concentrate into sterile containers without permitting contact with the atmosphere. Thus in this instance a belt conveyor 238 is provided to carry the jars 239 or like containers to filling positions. The upper run of this conveyor is enclosed by the housing 240, the ends of which are equipped with conventional rotary valves 241.

An intermediate part of the housing 240 is formed to provide an upwardly extending filling chamber 242, one side of which is provided with rubber sleeves 243, like the rubber sleeves 217 previously described with reference to Figure 13. Above the chamber 242 there are glass measuring tanks 244 which are connected to the pipe 245 leading from the storage tank 44. Each tank 244 is shown provided with valve controlled gas and vent pipes 246 and 247. Pipes 248 extend downwardly from tanks 244, and their inner ends are disposed immediately above the containers 239, when these containers are in filling positions. Suitable means is provided whereby the operator can control valves 249 for permitting or shutting off flow of concentrate from tanks 244. Pipe 250 connects with a suitable source of gas, whereby sterile inert gas free from oxygen is continuously bled into the housing 240 and continuously vented from this housing through pipe 251. In addition, means can be provided for flushing the sterile containers with the gas as they enter the unit.

In operating the equipment shown in Figure 3K, the various valves are arranged for easy manipulation by the operator, and the operator is also provided with control means for starting and stopping the conveyor 238. When containers are placed in filling positions, a valve 249 is opened and concentrate from the corresponding tank 244 is expelled by introduction of gas under pressure. After being filled, the container is sealed. Thus a container is filled under sterile conditions and without contact with oxygen. In connection with the maintenance of sterile conditions, it is to be presumed that these jars are sterilized, as by means of steam or otherwise, before being introduced into the filling equipment. After a measured amount of concentrate has been discharged from one of the tanks 244, this tank is again filled with concentrate by establishing communication with pipe 245, while the vent pipe 247 is opened.

In the foregoing reference has been made to use of oxygen-free gas in various units of the equipment, including the dehydrating unit. I prefer to use a gas which is sterilizing, in addition to being inert, sterile, and substantially free from oxygen. I have found that a gas containing a substantial amount of carbon monoxide, as for example from 0.5 to 2.5%, and devoid of oxygen, will have a distinct sterilizing action upon food material, while at the same time the absence of oxygen will serve to prevent discoloration and chemical changes such as affect taste, palatability, and vitamin content. Also I have found that a suitable gas containing from 0.5 to 2.5% of carbon monoxide and substantially devoid of oxygen can be obtained by the controlled burning of a suitable fuel gas (such as natural gas) with air. Suitable apparatus for forming such a gas has been shown in Figures 15 and 16. It consists of a mixing chamber 252 which connects with the combustion chamber 253. Air and fuel gas pipes 254 and 255 connect tangentially with chamber 252. The interior of this chamber is provided with staggered baffles 256 to insure a maximum amount of turbulence and mixing action as the air and gas pass through the length of this chamber. In chamber 253 the combustible mixture burns and the hot products of combustion pass through the boiler 257, the steam from which can be used for certain heating operations required in conjunction with the plant equipment. The exhaust conduit 258 leading from boiler 257 connects with a water spray type of cooler and washer 259. The lower part of this cooler is connected to the circulating pump 261 which serves to circulate water back to the spray head 262. The gas exhaust 263 from the washer 259 can now be used in the various units of the system provided, of course, that a suitable compressor or compressors may be employed where gas at considerable pressure is required, as for example for the purpose of expelling concentrate from the various tanks or containers.

In controlling the combustion mixture to secure the desired type of gas, the introduction of gas and air is controlled in order to give a stack gas having a formula substantially as follows:

| | Per cent |
|---|---|
| Nitrogen | 86 to 90 |
| Carbon dioxide | 6.5 to 10.5 |
| Carbon monoxide | 0.5 to 4 |

It will be apparent that this gas is absolutely sterile, due to the temperature at which it is generated.

As previously stated, after the fruit leaves the hot dipping unit 32 it remains sterile, and the fruit is never permitted to contact with oxygen. In this connection note that after removal of absorbed oxygen in the aeration unit 40, the juice is at all times contacted with an atmosphere devoid of oxygen, and also with an atmosphere which is sterile. Therefore, there is no further opportunity for oxidation or contamination with micro organisms.

In the handling of many materials, including citrus juices, I have found it desirable to divide the dehydrating tunnel into two compartments, with the first compartment operating at considerably higher gas temperature range than the second compartment. This is because more rapid evaporation of the juice before it approaches final concentration (by use of higher temperature gas) has the effect of causing a greater extent of cooling, thus causing the temperature of the juice to be maintained below a level such as might cause injury. An arrangement of this character is illustrated diagrammatically in Figure 17. A tunnel 186 is divided into two sections A and B, by the gate 266. Conduits 267 and 268 connect near the outlet ends of the two sections A and B, and both lead to the cooler 269. From this cooler two conduits 271 and 272 lead to the separate heaters and blowers 273 and 274, which in turn are connected by conduits 276 and 277 at points near the inlet ends of the sections A and B.

In the drying of orange juice it is desirable to keep the material at a temperature not to exceed 80° F. Thus for section A, the ingoing temperature of the drying gas can be at a value such as 105° F. Because of rapid evaporation of moisture from the juice, the juice itself will be maintained at a temperature below 80° F. in the initial drying. Drying gas entering the second section B is at a considerably lower temperature, as for example from 80 to 85° F., in order to keep the concentrate at a temperature below 80° F. The controlling thermostats for the heaters can be directly inserted into the material carried on the last cars of both sections.

The process and apparatus described above can be briefly reviewed as follows: Following inspection of the fruit to remove rejects, the fruit is subjected to the preliminary operations of wet scrubbing, hot dip sterilizing, and chilling in the cold dip unit to prevent penetration of heat into the sterile and cleaned fruit. Then the fruit is surface dried and introduced into the freezing unit. Following freezing, the sterile fruit is now supplied to the peeling unit where the peel is removed by surface attrition. The meat of the fruit is now disintegrated, and the disintegrated material is then subjected to centrifugal screening to free the juice from coarser pulp. The juice, which at this time contains some small amount of absorbed oxygen, is then subjected to the dispersing action of an oxygen-free insert gas, in the deaeration equipment, and is then sent to cold storage preparatory to concentration.

The stored fruit is then sent to the dehydrating unit where measured quantities are placed in the drying trays, and the drying trays are then progressed through the dehydrating tunnel. In the dehydrating tunnel the juice is concentrated by evaporation, at relatively low temperatures, and with gas of the character previously described which contains a substantial amount of carbon monoxide, thus imparting a sterilizing effect simultaneously with drying. After being concentrated, there may be an interval of further storage, after which the concentrate is introduced into sterile containers, likewise in the presence of an oxygen-free atmosphere. These containers are then sealed and provide a marketable preserved product.

My process and equipment will give remarkable results on a variety of food products. As applied to citrus fruit, like oranges, concentrations containing from 70 to 75% solids are generally obtained. This concentrate is a preserved product which will last indefinitely, and which has a relatively high vitamin content compared with the vitamin content of the original material. When re-mixed with water to form a material having the same consistency as the original juice, it has a flavor practically indistinguishable from the original juice. The above properties are attributed to various features of the process, including lack of oxidation and the relatively low temperature treatment throughout. In general the temperature of the drying gas should be regulated to a value below that which will cause the food to be heated to a temperature sufficient to impair its flavor. In general the lower the sugar content of juices, the higher may be its temperature during treatment without flavor or color impairment. As previously stated, with orange juice I have found that the juice during dehydration should be kept below about 80° F. In general the upper temperature limit of the material depends upon constituents such as the sugar-acid ratio, chlorophyl, pigments and flavor esters. With green vegetables like green peas and lima beans, a safe upper temperature is about 110° F., and with vegetables like spinach, beet tops, and cabbage, about 90° F. Tubers like potatoes, and also tomatoes will take temperatures as high as 212° F. Low temperatures such as specified cause no case hardening of solid materials, and aromatic esters, as for example esters which supplement flavor and which are generally found only in fresh food materials, are largely retained during drying.

Use of a sterilizing gas as specified has been found to have a marked effect in promoting production of a product which will keep for long periods without heat treatment or chemical preservatives. Analysis of orange juice concentrate made by my process reveals no trace of micro organisms such as cause mold growth, fermentation, or other form of spoilage, and no remaining traces of carbon monoxide can be found.

Aside from its application to citrus juice, the features of my process and system can be applied to a wide variety of food products. It will be apparent that a number of units of the complete system can be omitted in the handling of certain food products. For example, in using the process and equipment to form a tomato juice concentrate, one simply pulps the raw tomatoes under sterile conditions, after which peel and oversized particles are removed, and the remaining material introduced directly into the dehydrating unit. In the handling of fruit such as apples, peaches, apricots and the like, the fresh fruit can be cut into slices, under sterile and oxygen-free conditions, and then the sliced fruit introduced into the trays of the dehydrator and subjected to dehydration as previously described.

I claim:

1. In a process for the treatment of citrus fruit, the steps of freezing the fruit to an extent sufficient to cause the peel to be frozen and at least a portion of the flesh of the fruit, and then removing the peel of the fruit by surface attrition.

2. In a process for the treatment of citrus fruit, the steps of freezing the fruit to an extent sufficient to freeze the peel and at least the outer portion of the flesh, removing the peel by surface attrition, and then disintegrating the flesh to free the juice.

3. In a process for the handling of citrus juice, the steps of sterilizing the outer surfaces of the fruit, freezing the fruit to an extent at least sufficient to freeze the peel portion and the outer portion of the flesh, and then removing the peel by surface attrition.

4. In a process for the treatment of citrus fruit, the steps of scrubbing the outer surface of the fruit to remove foreign material, immersing the fruit in a hot sterilizing solution, immersing the fruit in a cold sterile liquid to prevent penetration of heat, drying the surfaces of the fruit, freezing the fruit to an extent at least sufficient to freeze the peel portion and an outer portion of the flesh, and then removing the peel portion by surface attrition.

5. In a process for the treatment of citrus fruit, the steps of freezing the peel of the fruit, removing the frozen peel by surface attrition, and then freeing the juices from the flesh.

MELVILLE E. DUNKLEY.

REFERENCES CITED

The following references are of record in the file of this patent:

UNITED STATES PATENTS

| Number | Name | Date |
|---|---|---|
| 1,166,588 | Hoffman | Jan. 4, 1916 |
| 1,272,750 | Wilson | July 16, 1918 |
| 1,361,498 | Ruff | Dec. 7, 1920 |
| 1,387,710 | Harrison | Aug. 16, 1921 |
| 1,418,457 | Owen | June 6, 1922 |
| 1,948,884 | Paterson | Feb. 27, 1934 |
| 2,061,188 | Cowgill | Nov. 17, 1936 |
| 2,101,352 | Takenga | Dec. 7, 1937 |
| 2,226,513 | McKinnis | July 14, 1942 |